(12) United States Patent
Imamura et al.

(10) Patent No.: US 8,018,674 B2
(45) Date of Patent: Sep. 13, 2011

(54) DISK DRIVE AND METHOD OF MEASURING FRICTIONAL CHARACTERISTICS

(75) Inventors: Takahiro Imamura, Ome (JP); Yoshitaka Suzuki, Fussa (JP); Yoshiaki Ikai, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 0 days.

(21) Appl. No.: 12/709,391

(22) Filed: Feb. 19, 2010

(65) Prior Publication Data

US 2010/0157456 A1    Jun. 24, 2010

Related U.S. Application Data

(63) Continuation of application No. PCT/JP2007/000893, filed on Aug. 21, 2007.

(51) Int. Cl.
*G11B 5/455* (2006.01)

(52) U.S. Cl. ........................................................ 360/75

(58) Field of Classification Search ......................... None
See application file for complete search history.

(56) References Cited

U.S. PATENT DOCUMENTS

| | | | | |
|---|---|---|---|---|
| 4,536,809 A | * | 8/1985 | Sidman | 360/77.04 |
| 5,115,664 A | * | 5/1992 | Hegde et al. | 360/137 |
| 5,473,230 A | * | 12/1995 | Dunn et al. | 360/73.03 |
| 5,539,592 A | * | 7/1996 | Banks et al. | 360/75 |
| 5,557,183 A | * | 9/1996 | Bates et al. | 360/73.03 |
| 5,859,357 A | * | 1/1999 | Kameyama et al. | 73/9 |
| 5,859,358 A | * | 1/1999 | Wood et al. | 73/9 |
| 6,225,799 B1 | * | 5/2001 | Gergel et al. | 360/75 |
| 6,510,016 B1 | * | 1/2003 | Hattori | 360/75 |
| 6,590,737 B2 | | 7/2003 | Imamura | |
| 7,095,578 B2 | * | 8/2006 | Ma | 360/75 |
| 7,143,002 B2 | * | 11/2006 | Hirano | 360/75 |
| 7,171,845 B2 | * | 2/2007 | Mate et al. | 73/105 |

FOREIGN PATENT DOCUMENTS

| | | |
|---|---|---|
| JP | 63-052037 | 3/1988 |
| JP | 02-045733 | 2/1990 |
| JP | 07-147068 | 6/1995 |
| JP | 2000-065720 | 3/2000 |

OTHER PUBLICATIONS

International Search Report mailed by Japan Patent Office on Dec. 4, 2007.

* cited by examiner

*Primary Examiner* — Hoa T Nguyen
*Assistant Examiner* — James L Habermehl
(74) *Attorney, Agent, or Firm* — Knobbe, Martens, Olson & Bear LLP

(57) ABSTRACT

According to one embodiment, in a disk drive, a voice coil motor is controlled to cause a head to minutely vibrate in a radial direction on a track of a disk. When the voice coil motor vibrates the head in the radial direction of the disk, frictional force occurring between the disk and the head is calculated based on the driving force of the voice coil motor generated to vibrate and detected positional information, thereby measuring frictional characteristics.

17 Claims, 3 Drawing Sheets

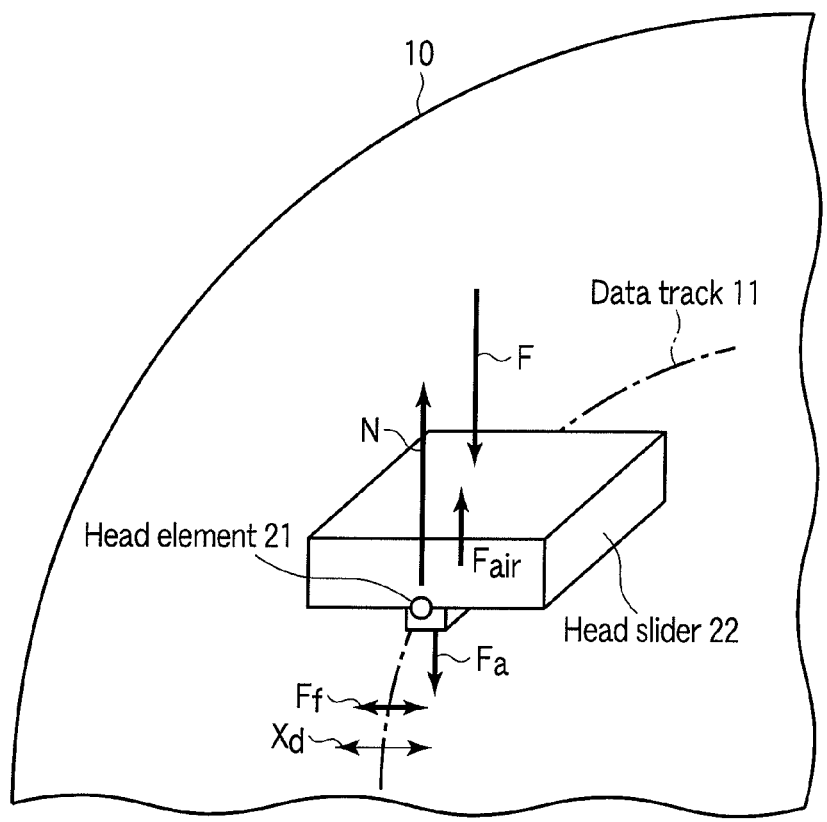
F I G. 1
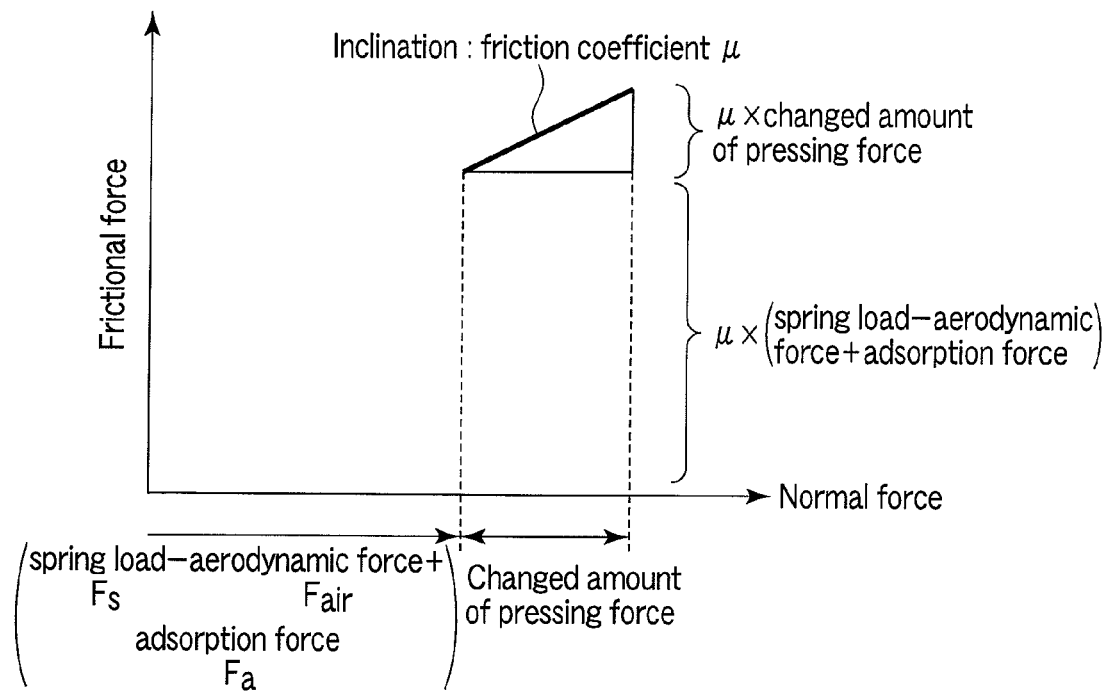
F I G. 2

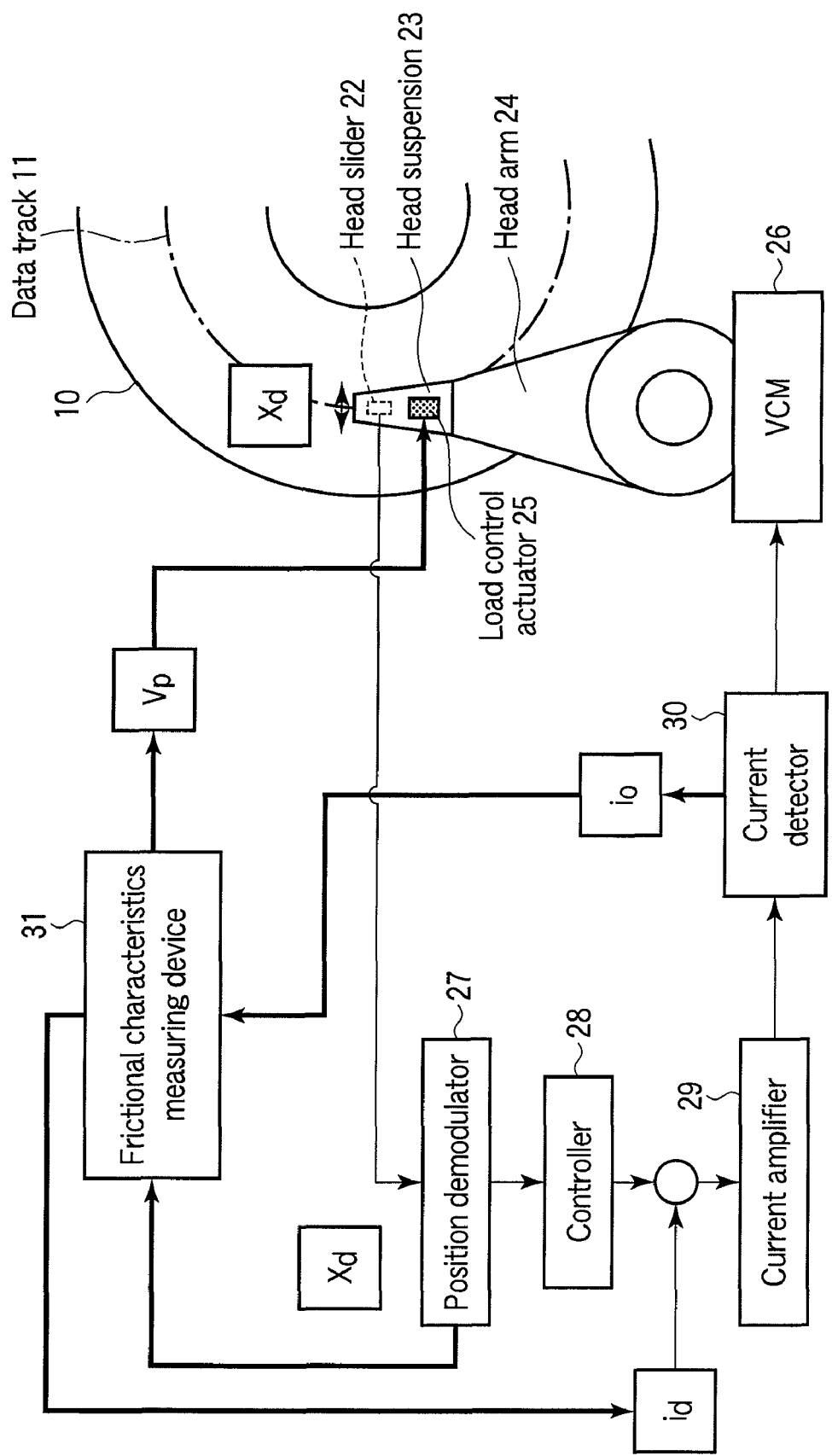
F I G. 3

DISK DRIVE AND METHOD OF MEASURING FRICTIONAL CHARACTERISTICS

CROSS-REFERENCE TO RELATED APPLICATIONS

This is a Continuation Application of PCT Application No. PCT/JP2007/000893, filed Aug. 21, 2007, which was published under PCT Article 21(2) in Japanese.

BACKGROUND

1. Field

One embodiment of the present invention relates to a disk drive and more particularly, to a frictional characteristics measuring technique in a contact recording system.

2. Description of the Related Art

In a disk drive such as a magnetic disk drive represented by a hard disk drive (HDD), in order to improve the recording density, it is necessary to make the flying height of the magnetic head as small as possible. However, as the flying height has already entered the zone of 10 nm or less, it is becoming more difficult to further reduce the flying height while also securing a margin for other variables. Against the background of these circumstances, a contact recording system in which a magnetic head and magnetic disk are in continuous sliding contact with each other was proposed some time ago.

Compared with the conventional HDD using a floating type slider, in which air pressure is utilized, in contact recording, in order to ensure stable recording/reproduction and a long lifespan, it becomes an essential task to avoid the state of excessive adhesion between the magnetic head and magnetic disk, stick-slip state, and jumping state, and reduce abrasion. For such purpose, it is necessary to keep the friction state in a desirable state by continuously monitoring the frictional characteristics inside the disk drive, and controlling the pressing load, and to issue, when a range of a certain variable is exceeded, an alarm to a host system.

One of the tasks/problems of frictional characteristics measurement is that an attraction force, such as the meniscus force or intermolecular force, acts between the magnetic head and magnetic disk in addition to the pressing load applied by the suspension or the like, hence the true friction coefficient cannot be obtained by simply measuring the in-plane force.

Further, to date, a method for accurately measuring the in-plane force in a disk drive has not been forthcoming. In general, when it is attempted to measure the frictional force with a high degree of sensitivity by using a sensor or the like, it is necessary to cause displacement in the direction of the frictional force by applying a force with a certain degree of springiness, and hence it is necessary to provide a part lower in rigidity than the periphery thereof. In a disk drive, when a part lower in rigidity is provided in the sliding direction of the magnetic disk, variations in the write or read signal in the time-axis direction are caused, and hence accurate read/write is disturbed.

The relational matter is disclosed in the prior art, for example Japanese Patent Application No. 10-235544 (Jpn. Pat. Appln. KOKAI Publication No. 2000-65720).

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 1 is a view for explaining the measurement principle in the disk drive and method of measuring frictional characteristics to which the present invention is applied;

FIG. 2 is a view showing the friction coefficient that can be obtained by the disk drive and method of measuring frictional characteristics to which the present invention is applied;

FIG. 3 is a block diagram showing an embodiment to which the present invention is applied.

DETAILED DESCRIPTION

Figure 4A:
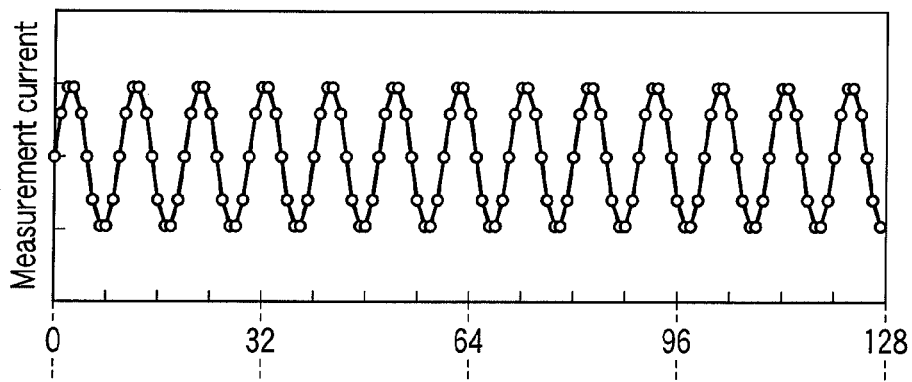
FIGS. 4A, 4B and 4C are a view for explaining an operation of the disk drive and method of measuring frictional characteristics to which the present invention is applied.

Various embodiments according to the invention will be described hereinafter with reference to the accompanying drawings. In general, according to one embodiment of the invention, there is provided a disk drive which includes method of measuring frictional characteristics configured to measure the frictional force (friction coefficient) acting between the magnetic head and magnetic disk.

According to the embodiment, FIG. 1 is a view for explaining the measurement principle in the disk drive and method of measuring frictional characteristics.

In FIG. 1, the disk drive such as a magnetic disk drive or the like, is provided with a head element 21 such as a magnetic head or the like, configured to write information to a disk 10 such as a magnetic recording medium, or the like on which information is recorded, or to read information from the disk 10. The head element 21 is mounted on a head slider 22.

When the head element 21 reads/writes information from/to the disk 10, the disk 10 and head slider 22 are in a sliding state at a circumferential speed of several tens m/s. A downward force F, caused by a head suspension (not shown), acts on the head slider 22, thus the head slider 22 is pressed against the disk 10 by the force F. Further, a piezoelectric actuator (not shown) is mounted on the head suspension, and force $kp \times Vp$ is superposed on the static pressing force $F_s$ due to the head suspension itself in proportion to a voltage Vp to be applied to the piezoelectric actuator. That is, there is a relationship of $F=Fs+kp \times Vp$. Further, in the vicinity of the head element 21, attraction force $F_a$ including the meniscus force of the lubricant and intermolecular force acts downwardly.

Furthermore, at a part in the head slider 22, and not in contact with the disk 10, aerodynamic force $F_{air}$ acts upwardly by the action of the airflow. The components of the aerodynamic force $F_{air}$ are the upward positive pressure, and downward negative pressure, and the resultant aerodynamic force is $F_{air}$. In consideration of the above, the normal force N at the part in contact with the disk is expressed by the following equation (1).

$$N = F + F_a - F_{air} = F_s + F_a - F_{air} + kp \times Vp \qquad (1)$$

In the right-hand side of the equation, $F_s$, $F_a$, and $F_{air}$ are DC-wise values, and $kp \times Vp$ can be made AC-wise or step function-wise depending on the method of application of Vp.

When the frictional force is $F_f$, and friction coefficient is $\mu$, there is a relationship $F_f = \mu N$. When Vp is applied AC-wise or step function-wise, the true friction coefficient $\mu$ from which the DC-wise attraction force $F_a$ is excluded can be obtained in connection with the AC component of $F_f$.

Incidentally, this $F_f$ occurs in the rotational direction which is the main sliding direction of the disk 10, and when the head slider 22 is driven in the direction intersecting the data track 11, it is conceivable that $F_f$ acts also in the direction intersecting the data track 11. A part having a lowered rigidity is provided in part of the support mechanism in the direction intersecting the head slider 22, whereby the measurement can be carried out by utilizing a position error signal written on the disk 10 in place of the measuring the force by using a sensor or the like.

Next, the method of measuring the frictional force intersecting the data track will be described below.

Now, it is assumed that the head slider 22 is placed on the data track 11 by servo control using a voice coil motor (VCM) (not shown). Assuming that a current $i_d$ of a frequency $f_d$ exceeding a servo band that can be controlled by the servo system is superposed on the VCM, torque $k_T \times i_d$ proportional to the applied current is generated. Here, $k_T$ is a torque constant, and is, for example, about 50 mNm/A.

When the distance from the rotation center of the VCM to the head element 21 is R, the frictional torque resulting from the frictional force $F_f$ is $F_f \times R$. When the sum total of the moment of inertia of the head slider 22 and moment of inertia of the head support mechanism such as the VCM and the like is J, an angular velocity is expressed by the following equation (2) develops.

$$\beta = (k_T \times i_d - F_f \times R)/J \tag{2}$$

The displacement $x_d$ at the position of the head element 21 is expressed by the following equation (3).

$$x_d = (R/J) \times \iint (k_T \times i_d - F_f \times R) dt^2 \tag{3}$$

Assuming that the drive current is a sinusoidal wave of the frequency $f_d$, the relationship between the amplitudes $|x_d|$, $|i_d|$, and $|F_f|$ of $x_d$, $i_d$, and $F_f$ is expressed by the following equation (4).

$$|x_d| = (R/J) \times [k_T \times |i_d| - R \times |F_f|]/(2\pi f_d)^2 \tag{4}$$

Further, $|F_f|$ can be obtained from $|x_d|$ by the following equation (5).

$$|F_f| = k_T \times |i_d|/R - |x_d|(2\pi f_d)^2 \times J/R^2 \tag{5}$$

FIG. 2 is a view showing the friction coefficient that can be obtained by the disk drive and method of measuring frictional characteristics.

By measuring the force $F_f$ obtained in the manner explained by using FIG. 1 while changing the pressing force, μ can be obtained from the ratio of the changed amount of the pressing force to the changed part of $F_f$ as shown in FIG. 2.

The above explanation covers the frictional characteristics measurement principle in the disk drive and method of measuring frictional characteristics. The prior art disclosed in the preceding patent application is premised on the fact that an electrostatic MEMS mechanism is needed in the head slider as the driving means, and a laser Doppler vibrometer (LDV) is used for displacement measurement, and this premise is not suitable for realization in a disk drive such as a magnetic disk drive to which the embodiment invention is applicable. Further, in the embodiment, displacement in the direction intersecting the data track 11, which is different from the main sliding direction, is used, whereby realization thereof in a disk drive such as a magnetic disk drive is facilitated.

FIG. 3 is a block diagram showing the embodiment.

The method of measuring frictional characteristics to which the embodiment is applied will be described below by using the block diagram shown in FIG. 3. The method of measuring frictional characteristics to which the embodiment is applied is constituted of the following processes:

(1) a process of positioning the head element 21 on the data track 11 by means of a positioning servo.

(2) a process of exerting a driving force for subjecting the head element 21 to reciprocating motion in a plane of the disk 10 at a frequency exceeding the servo band. Preferably, a high-frequency signal is superposed on the VCM 26.

(3) a process of measuring the motion displacement of the above frequency component. Preferably, a position signal of the head element 21 is used.

(4) a process of calculating the frictional force acting between the head element 21 and disk 10 from the relationship between the driving force of (1) and motion displacement of (3).

(5) a process of repeating the processes of (2) to (4) while changing the load perpendicular to the disk 10 by means of the head suspension 23 or the like. Preferably, the vertical load is changed by using a load control actuator 25 such as a piezoelectric actuator or the like provided on the head suspension 23.

(6) a process of obtaining, in (5), the friction coefficient from the changed amount of the vertical load and changed amount of the frictional force.

(7) a process of obtaining, in (5), the attraction force by subtracting the known vertical loads such as the spring load, aerodynamic force, and the like from the DC component of the frictional force.

More specifically, first, information (magnetic information) recorded on the data track 11 of the disk 10 is read by the head element 21 such as a magnetic head or the like mounted on the head slider 22. Further, the information is demodulated by a position demodulator 27 configured to generate a signal corresponding to the positional deviation from a track sensor by using information recorded on the disk 10, and the head slider 22 is kept on the data track 11 by a servo system configured to control the current flowing through the VCM 26 by a controller 28. It is assumed that the position demodulation to be carried out by the position demodulator 27 covers a frequency band extending to a predetermined frequency exceeding the servo band.

Figure 4B:
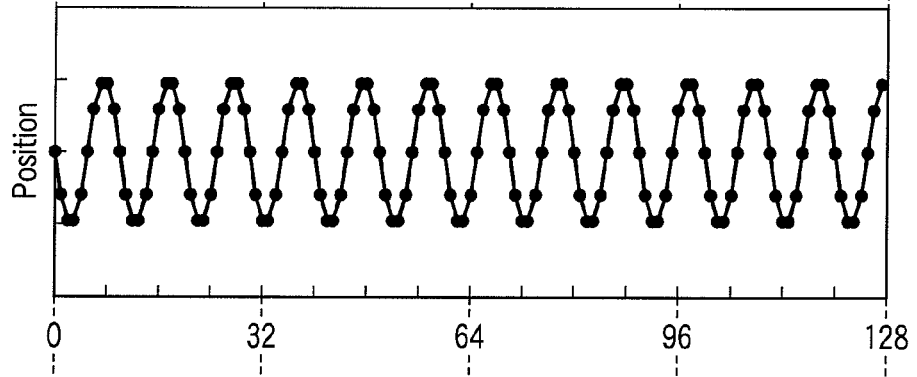
Figure 4C:
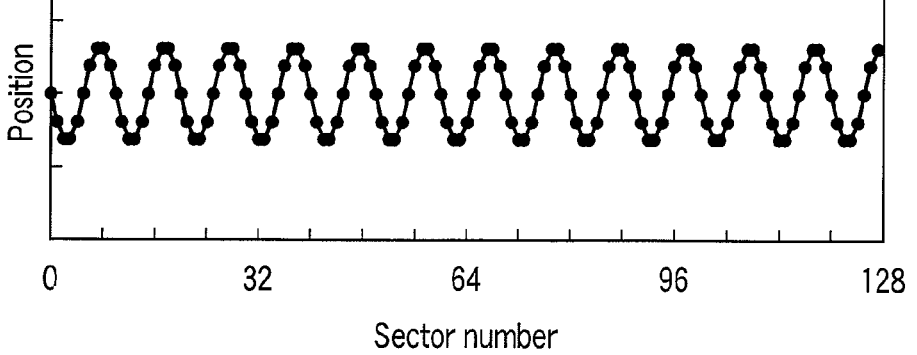

A frictional characteristics measuring device 31 outputs a measurement current of a frequency exceeding the servo band to be superposed on the VCM 26. As a result of this, the head slider 22 is vibrated in the direction intersecting the data track 11 with small displacement. The position demodulator 27 measures the vibration amplitude corresponding to the measurement current, and returns the measurement result to the frictional characteristics measuring device 31. The frictional characteristics measuring device 31 calculates the frictional force from a relationship between the superposed current and frequency thereof, and vibration amplitude corresponding to the current and frequency. At this time, a current detector 30 may be provided between the current amplifier 29 and VCM 26 to monitor the actually flowing current. A relationship between the measurement current and vibration amplitude is as shown in FIGS. 4A, 4B and 4C. In FIGS. 4A, 4B and 4C, the case where the changed amount of the pressing force is a positive value is shown.

In this manner, the frictional force in the direction intersecting the data track 11 can be obtained in a state of certain pressing force.

Further, the frictional characteristics measuring device 31 applies a voltage to the load control actuator 25 provided on the head suspension 23 to change the pressing load.

Further, the frictional characteristics measuring device 31 measures the frictional force corresponding to the load state by the same method. The unit 31 repeats the above process, derives the relationship shown in FIG. 2, and calculates the friction coefficient. Further, it is possible to obtain the attraction force, previously unknown, by using the determined value of the friction coefficient.

That is, the disk drive to which the present invention is applied is a disk drive such as an HDD or the like configured to read information from a rotating disk 10 on which the information is written. The disk drive includes a head element 21 configured to read/write information from/to the disk 10, head slider 22 on which the head element 21 is mounted, head suspension 23 configured to support the head slider 22, and apply pressing force acting in the direction toward the disk 10 to the head slider 22, head arm 24 configured to retain the head suspension 23, VCM 26 configured to retain the head arm 24, and generate torque acting to move the head slider 22 in the radial direction of the disk 10, position demodulator 27 configured to demodulate positional information on the head element 21 from the read information, controller 28 configured to control the VCM 26 on the basis of the positional information, and current amplifier 29 configured to apply a current corresponding to an output from the controller 28 to the VCM 26.

Further, in the disk drive, a process of positioning the head slider 22 on an arbitrary data track 11, process of vibrating the head element 21 on arbitrary one of data tracks 11 provided substantially concentric on the disk 10 at a high measurement frequency exceeding the servo band of the control system configured to control the VCM 26 by applying force or torque to the head element 21 in the direction intersecting the data track 11, process of detecting in-plane vibration displacement of the head slider 22 corresponding to the measurement frequency, and process of calculating the magnitude of the frictional force acting between the disk 10 and head slider 22 from a relationship between the force or torque and in-plane vibration displacement, are executed.

Furthermore, the disk drive is provided with means for changing the pressing load of the head suspension 23, and executes a process of changing the pressing load stepwise at predetermined time intervals. Further, at each of the pressing loads, the disk drive executes the above-mentioned process of carrying out measurement of the frictional force, a process of acquiring a changed amount of the pressing load between adjacent pressing loads, process of acquiring a changed amount of frictional force corresponding to the changed amount of the pressing load between the adjacent pressing loads, and process of calculating the friction coefficient from the ratio of the changed amount of the pressing force to the changed amount of the frictional force.

Furthermore, the disk drive executes a process of dividing the frictional force by the friction coefficient to calculate the effective normal force.

Furthermore, the disk drive executes a process of subtracting the spring load before the change, and known vertical load from the effective normal force to calculate the attraction force acting between the disk 10 and head slider 22.

Further, the disk drive is provided with means for making, in the frictional force measurement process, the force or torque substantially sinusoidal, and detecting the amplitude and vibration amplitude of the head element 21, and can also obtain the frictional force on the basis of the detected amplitudes.

Further, the disk drive is provided with a piezoelectric element on the head suspension 23, and can, in the frictional force measurement process, also change the pressing load by applying a voltage to the piezoelectric element.

Further, in the frictional force measurement process, the disk drive can also execute changing of the pressing force by utilizing the variation in the load passively occurring due to geometrical undulation of the disk 10, and by estimating the variation in the load using an output from a load variation measuring means such as a piezoelectric sensor or strain gage provided on the head suspension 23.

Furthermore, the disk drive can also execute calculation of the attraction force by calculating in advance the aerodynamic force caused by the positive pressure or negative pressure occurring between the disk 10 and head slider 22 due to an airflow concomitant with the rotation of the disk 10 as a known vertical load, and subtracting the aerodynamic force as the known vertical load.

As described above, by applying the embodiment, it becomes possible to measure the frictional force acting between the head element 21 such as a magnetic head or the like and a disk 10 such as a magnetic disk in the disk drive, separate the attraction force from the normal force to thereby measure the true friction coefficient without requiring a large-scale device such as an LDV or the like to be installed inside a disk drive such as a magnetic disk drive, and without sacrificing the rigidity of the head support mechanism such as head arm 24 or the like.

The embodiment has been described above with reference to the drawings. However, the embodiment is not limited to the matters described above, and various configurations or shapes can be employed.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A disk comprising:
 a head in contact with a disk by a head suspension;
 a controller configured to move the head to a position on a track by controlling a driving force generated by a voice coil motor;
 a head position detector configured to detect the position on the track of the head as head position information; and
 a calculator configured to calculate a frictional force between the disk and the head based on the driving force of the voice coil motor and the head position information detected by the head position detector, wherein the calculator is configured to calculate the frictional force when the voice coil motor vibrates the head in the radial direction of the disk by the controller.

2. The disk drive of claim 1, wherein the controller is configured to control the voice coil motor at a substantially high frequency for measurement exceeding a servo frequency band in order to move the head in the radial direction of the disk.

3. The disk drive of claim 1, further comprising an actuator configured to change the pressing force of the head suspension, wherein
 the calculator is configured to calculate the frictional force at steps of the pressing force when the pressing force is changed stepwise by the actuator, and to calculate the friction coefficient based on an amount of change in the pressing force and an amount of change in the frictional force.

4. The disk drive of claim 3, wherein the calculator is configured to calculate the normal force between the head and the disk by dividing the frictional force by the friction coefficient.

5. The disk drive of claim 4, wherein the calculator is configured to calculate the attraction force between the head and the disk based on the normal force and the pressing force.

6. The disk drive of claim 5, wherein the calculator is configured to subtract the aerodynamic force between the disk and the head due to an airflow concomitant with the rotation of the disk from the attraction force calculated based on the normal force and the pressing force.

7. The disk drive of claim 3, wherein the actuator is configured to change the pressing force by applying a voltage to a piezoelectric element on the head suspension.

8. The disk drive of claim 3, further comprising load fluctuation measuring module on the head suspension, configured to measure fluctuation in the load passively induced from geometrical undulation of the disk, and to provide the measured load fluctuation to the calculator.

9. The disk drive of claim 1, wherein the calculator is configured to calculate the frictional force between the head and the disk based on an amplitude of a sinusoidal current corresponding to the driving force of the voice coil motor and a vibration amplitude of the head calculated from the head position information.

10. A method of measuring frictional characteristics in a disk drive which comprises a head being in contact with a disk by a head suspension, the method comprising:
controlling a driving force generated by a voice coil motor in such a manner that the head moves to a position on a track in the radial direction of the disk;
calculating a frictional force between the disk and the head based on the driving force of the voice coil motor and the head position information detected by a head position detector; and
controlling the voice coil motor at a substantially high frequency for measurement exceeding a servo band to move the head in the radial direction of the disk.

11. The method of claim 10, further comprising:
changing the pressing force of the head suspension by an actuator;
calculating the frictional force at steps of the pressing force; and
calculating the friction coefficient based on an amount of change in the pressing force and an amount of change in the frictional force.

12. The method of claim 11, further comprising calculating the normal force between the head and the disk by dividing the frictional force by the friction coefficient.

13. The method of claim 12, further comprising calculating the attraction force between the head and the disk based on the normal force and the pressing force.

14. The method of claim 13, further comprising subtracting the aerodynamic force between the disk and the head due to an airflow concomitant with the rotation of the disk from the attraction force calculated based on the normal force and the pressing force.

15. The method of claim 11, further comprising changing the pressing force by applying a voltage to a piezoelectric element provided on the head suspension.

16. The method of claim 11, further comprising measuring passive load fluctuation from geometrical undulation of the disk at the head suspension, and using the measured load fluctuation in the calculating.

17. The method of claim 10, further comprising calculating the frictional force between the head and the disk based on an amplitude of a sinusoidal current corresponding to the driving force of the voice coil motor and a vibration amplitude of the head calculated from the head position information.

* * * * *